United States Patent
Pincemin

(10) Patent No.: US 7,298,948 B2
(45) Date of Patent: Nov. 20, 2007

(54) DEVICE FOR OPTICALLY REGENERATING PULSES, AN INSTALLATION INCLUDING SUCH A DEVICE, AND THE USE OF THE DEVICE

(75) Inventor: Erwan Pincemin, Gommenec'h (FR)

(73) Assignee: France Telecom, Paris (FR)

( * ) Notice: Subject to any disclaimer, the term of this patent is extended or adjusted under 35 U.S.C. 154(b) by 0 days.

(21) Appl. No.: 11/366,350

(22) Filed: Mar. 2, 2006

(65) Prior Publication Data

US 2006/0228081 A1  Oct. 12, 2006

(30) Foreign Application Priority Data

Mar. 2, 2005  (FR) .................... 05 02125

(51) Int. Cl.
*G02B 6/00* (2006.01)
(52) U.S. Cl. .................................... 385/122
(58) Field of Classification Search .............. None
See application file for complete search history.

(56) References Cited

U.S. PATENT DOCUMENTS 6,327,061 B1 * 12/2001 Desurvire ................ 398/9
2004/0076373 A1 * 4/2004 Blow et al. ................ 385/27

OTHER PUBLICATIONS

Atkinson, D. et al; "Increased Amplifier Spacing In A Soliton System With Quantum-Well Saturable Absorbers And Spectral Filering"; Optics Letters, OSA, Optical Society of America; vol. 19, No. 19; Oct. 1994; pp. 1514-1516.*
Atkinson, D. et al; "Increased Amplifier Spacing In A Soliton System With Quantum-Well Saturable Absorbers And Spectral Filering"; Optics Letters, OSA, Optical Society of America; vol. 19, No. 19; Oct. 1, 1994; pp. 1514-1516.
Dany B. et al.; "Numerical Study Of Long-Haul 1610 Gbit/s Soliton Transmission Using Dispersion Management And Narrowband Filtering"; Electronics Letters; IEE Stevenage, GB, vol. 34, No. 21; Oct. 15, 1998.
Kumasako J, et al.; "Linear Stability Analysis Of Dispersion-Managed Solitons Controlled By Filters"; Journal Of Lightwave Technology, IEEE Service Center, New York, US.; vol. 18, No. 8; Aug. 2000; pp. 1064-1068.

* cited by examiner

*Primary Examiner*—Michelle Connelly-Cushwa
*Assistant Examiner*—Chris Chu
(74) *Attorney, Agent, or Firm*—Robert L. Epstein; Epstein Drangel Bazerman & James, LLP

(57) ABSTRACT

The invention relates to in particular to a device for optically regenerating pulses, the device comprising an optical bandpass filter adapted for providing time synchronization and intensity stabilization of dispersion-managed soliton pulses. The device further comprises noise suppression means distinct from the bandpass filter.

14 Claims, 3 Drawing Sheets

DEVICE FOR OPTICALLY REGENERATING PULSES, AN INSTALLATION INCLUDING SUCH A DEVICE, AND THE USE OF THE DEVICE

The present invention relates to a device for optically regenerating pulses, to an installation including such a device, and to the use of the device.

More precisely, the invention relates to regenerating dispersion-managed soliton pulses transmitted over an optical fiber. Dispersion-managed soliton pulses are also referred to as DM soliton pulses.

BACKGROUND OF THE INVENTION

DM soliton pulses have the property of propagating periodically without deformation in a non-linear medium, since these particular pulses constitute a solution to the non-linear Schrödinger equation. Nevertheless, accumulated amplified spontaneous emission noise, in particular as generated by optical amplifiers disposed at regular intervals along the optical fiber, disturbs the propagation of such pulses by generating intensity fluctuations and so-called Gordon-Haus time jitter. Collisions between DM soliton pulses belonging to different channels of the optical fiber also constitute a source of jitter (known as collision jitter).

While pulses are propagating along an optical fiber, their time and spectral profile and also their time and spectral positions are modified under the effects of various disturbing influences, whence the need to perform optical regeneration.

An optical pulse-regenerator device is already known in the state of the art that comprises an optical bandpass filter adapted for time-synchronizing and intensity-stabilizing pulses, in particular the device disclosed in the document entitled "Linear stability analysis of dispersion-managed solitons controlled by filters" by J. Kumasako and M. Matsumoto, taken from the Journal of Lightwave Technology, Vol. 18, No. 8, August 2000.

The filter is adjusted by acting on its center frequency and on its bandwidth. The use of a bandpass filter makes it possible firstly to synchronize pulses in time by re-centering them on the center frequency of the filter, and secondly to stabilize the intensity of the pulses by filtering the extreme frequencies of the spectrum of the pulses, which extreme frequencies have appeared during pulse propagation.

For the filter to be effective, it must be narrow enough to limit the spectrum width of a pulse and to eliminate noise. Nevertheless, if the filter is too narrow, it runs the risk of changing the optimum waveform of the pulse with the danger of destabilizing and disturbing its propagation in the optical fiber. Selecting the spectrum width of the filter is thus the result of a compromise.

Because the filter used must not be too narrow, the filter is ineffective in eliminating amplified spontaneous emission noise. Consequently, the prior art regenerator device is ineffective in eliminating such noise, which therefore tends to accumulate as pulses are transmitted along the optical fiber. This is particularly true of a wavelength-multiplexed line.

OBJECT AND SUMMARY OF THE INVENTION

The invention seeks to provide a device for optically regenerating pulses that can be adjusted easily and accurately, to obtain simultaneously synchronization in time; stabilization of intensity; and the elimination of transmitted pulse noise.

To this end, the invention provides a device for optically regenerating pulses, the device comprising an optical bandpass filter adapted to obtain time synchronization and intensity stabilization of dispersion-managed soliton pulses, the device further comprising noise suppression means that are distinct from the bandpass filter.

Thus, since the noise suppression means are distinct from the bandpass filter, it is possible to adjust independently the noise suppression means and the filter for the purpose of optimizing its functions of time synchronization and intensity stabilization of the pulses.

In a particular embodiment, the noise suppression means comprise a saturable absorber for suppressing amplified spontaneous emission noise.

The use of a saturable absorber in combination with an optical filter makes it possible to obtain a device for optical regeneration that is entirely passive. Such a regenerator device is particularly advantageous for transoceanic applications in which the supply of electrical energy must be limited to the strict minimum because of the difficulty in providing it.

It is also possible to use a non-linear optical loop mirror (NOLM) or a highly non-linear fiber as the means for suppressing amplified spontaneous emission noise, given that they present transfer functions similar to that of a saturable absorber. Preferably, the transfer function of the noise suppression means is a staircase-shaped transfer function.

Optionally, the transfer function of the filter presents a profile that is substantially Gaussian or sine-shaped. Since soliton pulses are pulses having a profile that is substantially Gaussian, their spectrum has a profile that is Gaussian. It is therefore advantageous for the transfer function of the filter to be as close as possible to the spectrum of the pulses in order to avoid destabilizing them. Sine filters and Gaussian filters have profiles that are very similar. It is therefore equally possible to use a Gaussian filter or a sine filter for regenerating DM soliton pulses.

In a particular embodiment, the half-height frequency width of the filter is substantially equal to twice the half-height frequency width of the dispersion-managed soliton pulses to be regenerated. Setting the filter in this way enables the pulses to be filtered sufficiently, but without thereby destabilizing their propagation.

Optionally, the bandpass filter is adapted to pass a plurality of distinct frequencies that are predefined and separated in pairs by bands of frequencies that are attenuated by the filter, so as to filter simultaneously a plurality of frequency-multiplexed pulses in an optical signal.

It is then possible to filter a signal comprising a plurality of frequency-multiplexed channels without it being necessary to perform demultiplexing and re-multiplexing operations since such a device regenerates all of the channels of the signal simultaneously.

Advantageously, the filter is periodic in frequency.

It is common practice for the multiplexing frequencies that are used to be separated from one another in pairs by a common frequency interval.

In a particular embodiment, a periodic filter is used having a modulation depth lying in the range 0.5 decibels (dB) to 4 dB, and preferably lying in the range 1 dB to 4 dB, and/or having modulation depth lying in the range 10% to 60% of the frequency height of the pulses to be regenerated. This value for modulation depth makes it possible to obtain satisfactory time resynchronization of the pulses and also to suppress amplitude noise effectively without thereby destabilizing the DM soliton pulses.

A Fabry-Perot type filter is an example of a frequency periodic bandpass filter suitable for use in the device of the invention.

The invention also provides an installation for optical transmission of dispersion-managed soliton pulses, including optical pulse propagation means, the installation including a device for optically regenerating pulses as defined above, inserted in the propagation means.

Advantageously, the regenerator device is inserted in the propagation means close to a point where the spectrum width of the pulses reaches a maximum.

During pulse propagation, under the influence of non-linear effects, the spectrum of the pulses tends to become wider. Consequently, since the filter has the function of returning such pulses to their initial spectrum width, it is advantageous to filter the pulses at a point where their spreading is at a maximum.

In a particular embodiment, the light pulse propagation means comprise first propagation means having abnormal dispersion and second propagation means having normal dispersion, and the light pulse propagation means are adapted so that the pulses reach a maximum spectrum width in the vicinity of the middle of the first propagation means.

The invention also provides the use of a device of the invention for regenerating dispersion-managed soliton pulses.

BRIEF DESCRIPTION OF THE DRAWINGS

The invention can be better understood with the help of the following description given purely by way of example and made with reference to the accompanying drawings, in which.

MORE DETAILED DESCRIPTION

Figure 1:
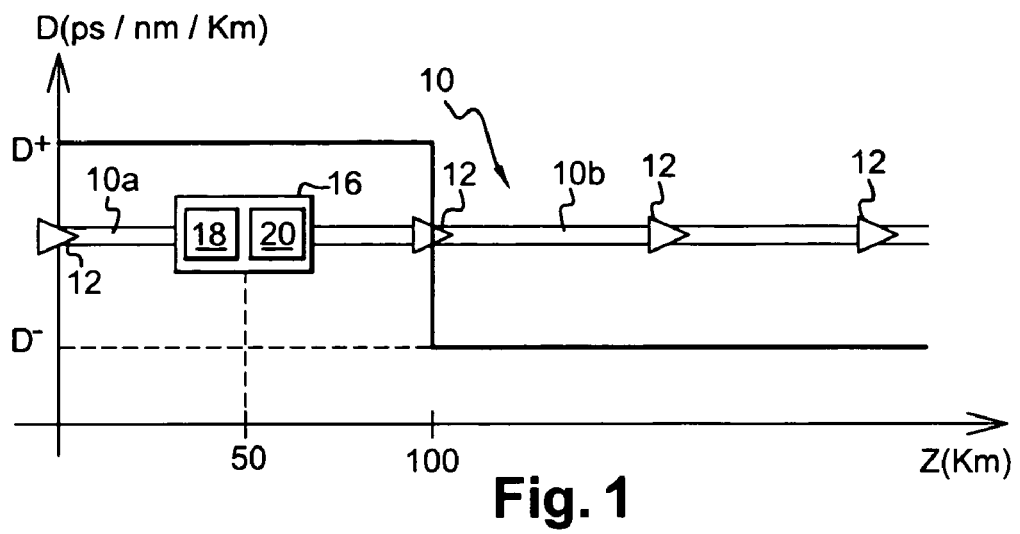
FIG. 1 is a diagram showing the general structure of a light pulse transmission installation of the invention.

The optical transmission installation shown in FIG. 1 comprises a line fiber 10 forming means for propagating a light signal.

The light signal in question is made up of a plurality of frequency-multiplexed channels. The multiplexed frequencies are multiples of a frequency $f_0$.

Each channel is made up of pulses of the DM soliton type. These pulses are used for very high rate optical transmission applications, e.g. for transmitting at 40 gigabits per second (Gbit/s) or higher. The term "bit time" is used to designate the transmission period of the pulses. The half-height time width of DM soliton pulses is generally of the same order as half the bit time.

The line fiber 10 has a first portion 10a performing the function of propagation means having abnormal dispersion, with a dispersion coefficient $D^+$ that is equal to 2.55 picoseconds per nanometer per kilometer (ps/nm/km), for example. This first portion of fiber 10a having abnormal dispersion is extended by a second portion of fiber 10b having normal dispersion, with a dispersion coefficient $D^-$ that is equal to −2.45 ps/nm/km. The first and second portions of fiber 10a and 10b may each have a length of 100 kilometers (km).

The diagram of FIG. 1 can be reproduced periodically in order to form a line fiber 10 of significantly greater length, in particular a line fiber suitable for transoceanic transmission.

The optical transmission installation also comprises optical amplifiers 12 inserted at regular intervals in the line fiber 10. These amplifiers are the origin of amplified spontaneous emission noise that disturbs the pulses. This noise appears in the form of disturbing frequencies that are regularly distributed in the spectrum of the pulses.

In general, a DM soliton pulse has a plurality of different frequency components because of its time width. However, the refractive index of the optical fiber varies as a function of frequency, and the propagation speed of a pulse along the fiber depends on the refractive index of the fiber. Consequently, the various components of the pulse are transmitted along the line fiber 10 at speeds that are different and the time width of the pulse varies as it propagates along the line fiber 10. These are referred to as linear dispersing effects.

In addition to the linear dispersing effects, the pulse is also subjected to non-linear effects such as phase self-modulation. These effects lead to variations in the spectral width of the pulse.

On being transmitted in the line fiber 10, the pulses are thus subjected to deformation and need to be regenerated at regular intervals.

An optical regenerator device 16 is inserted in the line fiber 10. It comprises a bandpass filter 18 together with a saturable absorber 20. The bandpass filter is adapted to perform time synchronization and intensity stabilization of DM soliton pulses by suppressing the extreme frequencies of the spectrum so as to re-center the pulse on its initial frequency. In order to ensure that the filtering of DM solitons does not de-stabilize their transmission, the transfer function of the filter is substantially of Gaussian or sine profile. The saturable absorber constitutes noise suppression means.

Figure 2A:
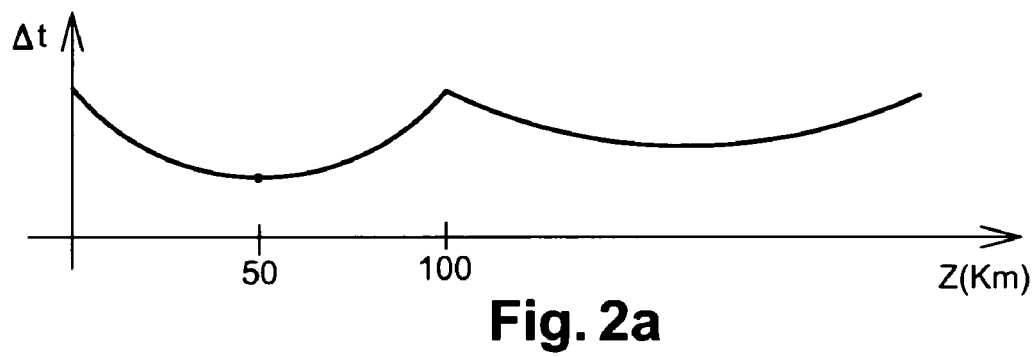
FIG. 2 comprises diagrams showing how the time width and the spectrum width of a pulse transmitted over the FIG. 1 installation vary.

FIG. 2a is a graph showing the time width of a pulse as a function of propagation along the line fiber 10. Depending on the dispersion coefficient of the line fiber 10, the time width of a pulse either increases or decreases, thereby causing beats in the pulse. The time width of a pulse reaches a local minimum in the middle of the first fiber portion 10a and in the middle of the second fiber portion 10b.

Figure 2B:
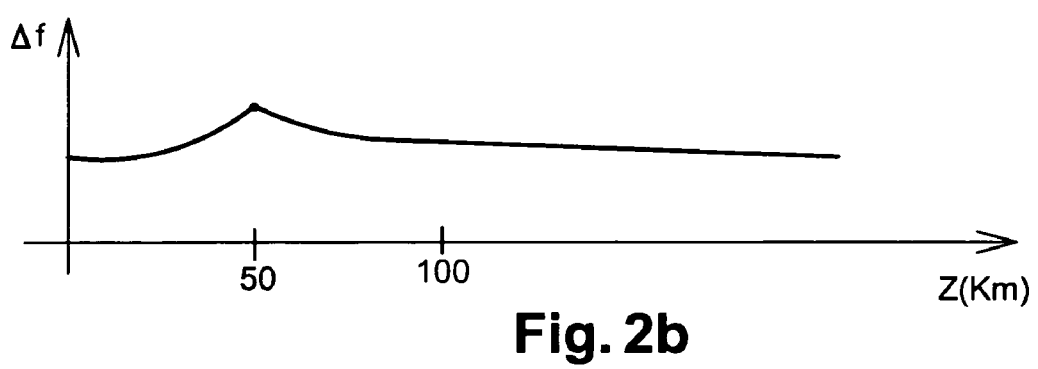

The non-linear effects lead to variations in the spectrum width of the pulse as shown in FIG. 2b. In the example of FIG. 1, the spectrum width reaches a maximum substantially in the middle of the first fiber portion 10a.

The optical regenerator device 16 is thus preferably inserted in the vicinity of the middle of the first portion of fiber 10a, i.e. when the spectrum width reaches this maximum.

Figure 3:
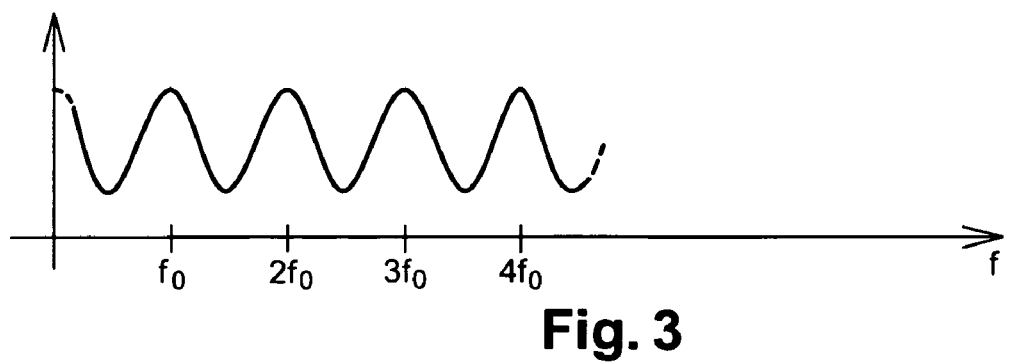
FIG. 3 is a diagram showing the transfer function of a periodic bandpass filter of a device for optically regenerating pulses in one possible embodiment of the invention.

By way of example, the bandpass filter 18 is a Fabry-Perot periodic optical filter having a frequency profile as shown in FIG. 3. It is constituted by a predefined pattern being repeated periodically. Each pattern is for filtering one of the channels of the signal transmitted by the line fiber 10. For this purpose, each pattern is centered on a frequency that is a multiple of the multiplexing frequency $f_0$ of the channels.

The filter is adjusted by adjusting the profile of the periodic pattern, thereby acting on the modulation depth of the filter. Modulation depth characterizes the selectivity of the filter. Deep or high modulation depth means that the filter passes only very narrow frequency bands and that it attenuates strongly the intermediate frequency bands. Shallow or low modulation depth means that the filter allows broad frequency bands to pass through and that the intermediate frequencies are attenuated only slightly.

The filter of the invention preferably presents moderate modulation depth. The modulation depth of the filter must not be too shallow in order to ensure that the desired time synchronization and amplitude stabilization effects are obtained, nor must it be too deep in order to avoid changing the profile of the pulses and thus disturb their propagation.

For example, the half-height frequency width of one of the patterns of the periodic filter should be adjusted in such as a manner as to be equal to about twice the half-height frequency width of the signal at the point where the filter is located. More precisely, a periodic filter should be used presenting modulation depth lying in the range 0.5 dB to 4 dB and/or presenting modulation depth lying in the range 10% to 60% of the frequency height of the pulses to be regenerated.

Since the modulation depth cannot be too high, the periodic filter is not effective in suppressing disturbing frequencies interposed between the multiplexing frequencies and due to amplified spontaneous emission noise. The saturable absorber 20 thus serves to suppress this amplified spontaneous emission noise by passing only those signals that are of an amplitude that is not less than some predetermined minimum threshold.

Figure 4:
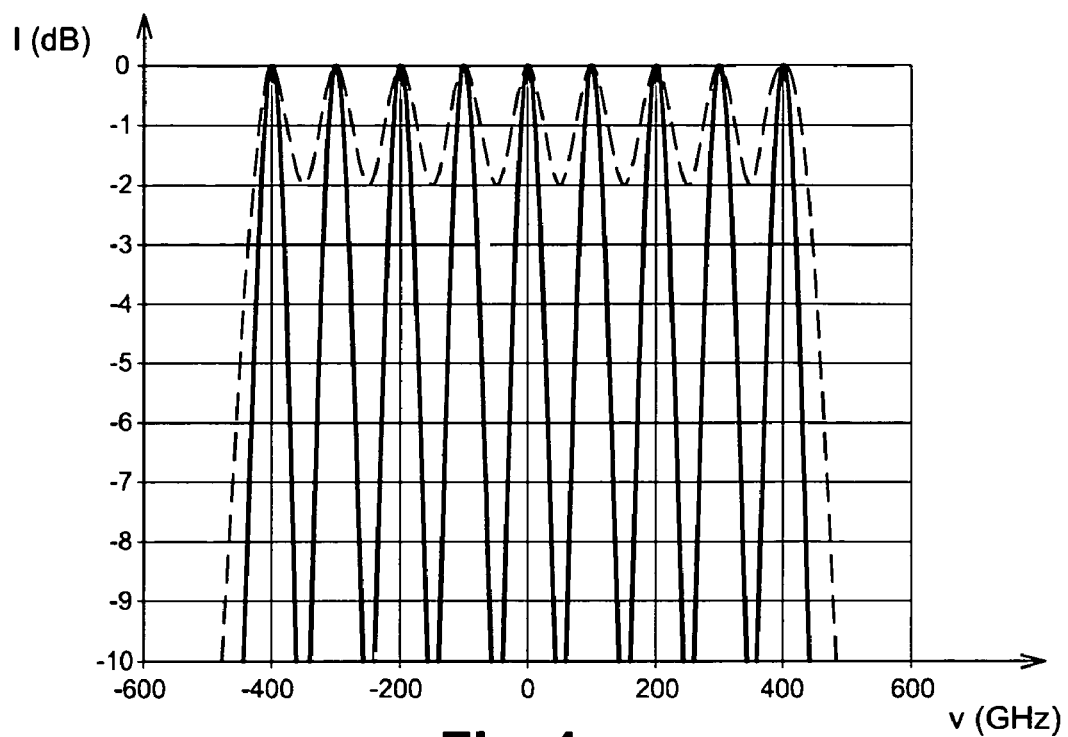
FIGS. 4 and 5 are graphs showing the frequency profiles of Gaussian filters adapted to filter a signal comprising nine multiplexed channels.
Figure 5:
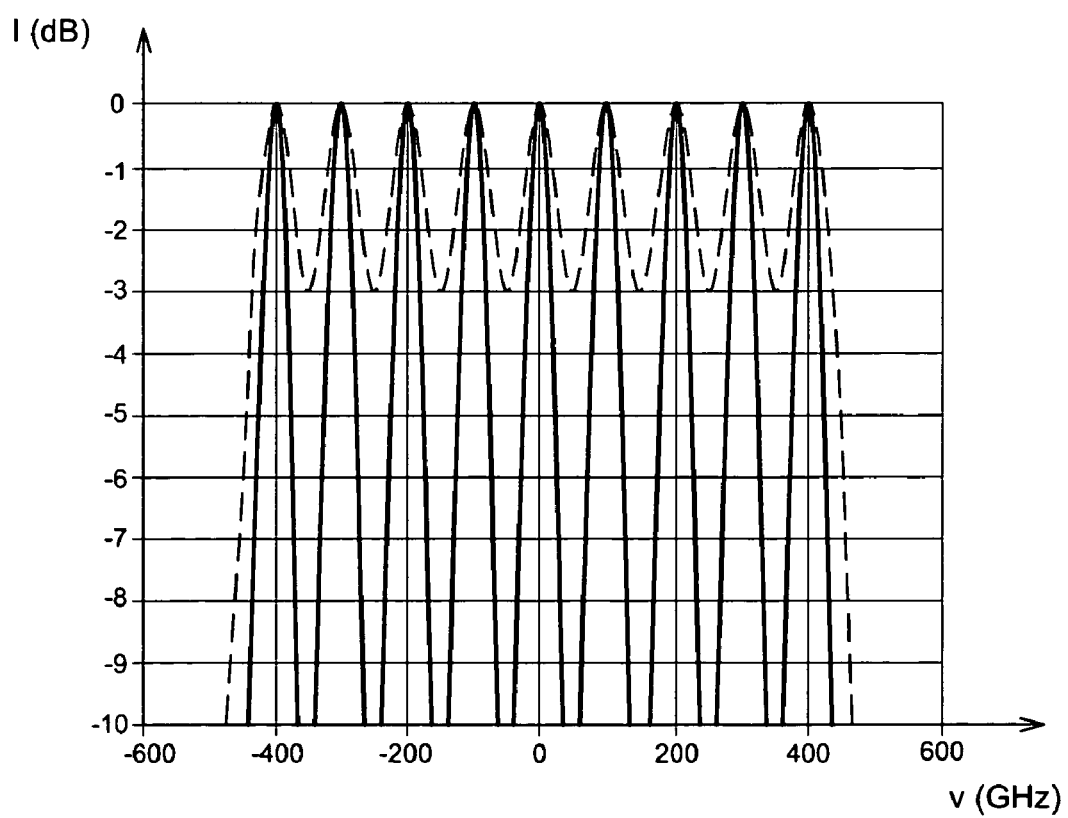
Figure 6:
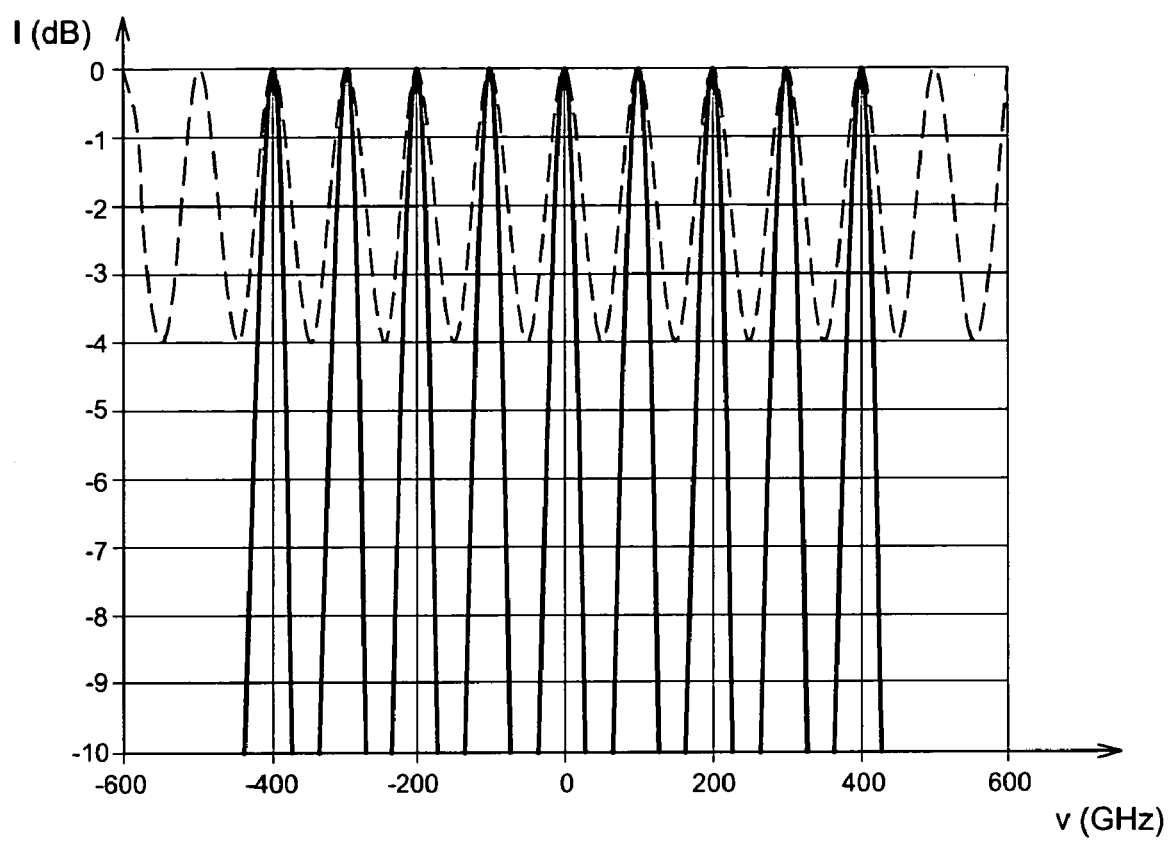
FIG. 6 is a graph showing the frequency profile of a sine filter adapted to filter a signal comprising nine multiplexed channels.

By way of example, continuous lines in FIGS. 4, 5, and 6 show the spectrum profile of a signal transmitted over the optical fiber 10 and comprising nine frequency-multiplexed channels that are spaced apart in pairs at 100 gigahertz (GHz) intervals, i.e. at 0.8 nanometer (nm) intervals. The information transmitted on each channel is coded using a 50% return to zero (RZ) code format (an RZ format in which the duty ratio of the pulses is equal to 50%) operating at 40 Gbit/s. The duty ratio of a pulse is equal to the half-height width of the pulse divided by the bit time.

Since the bit time at 40 Gbit/s is equal to 25 picoseconds (ps) and the duty ratio is 50%, the half-width of a pulse is 12.5 ps. Consideration is given below to the width $T_0$ at $1/\exp(1)$ of a pulse. In the example described, $T_0=7.5070$ ps.

The mathematical formula for the intensity profile of the periodic filter 18 of the invention is then as follows for a filter having a Gaussian profile:

$$I_{gauss}(v)=I_{gauss1}(v)+I_{gauss2}(v)+I_{gauss3}(v)+I_{gauss4}(v)+I_{gauss5}(v)+I_{gauss6}(v)+I_{gauss7}(v)+I_{gauss8}(v)+I_{gauss9}(v)$$

where $$I_{gauss1}(v)=\exp^2(-4*\pi^2*v^2*p^2/2)$$

$$I_{gauss2}(v)=\exp^2(-4*\pi^2*(v-100)^2*p^2/2)$$

$$I_{gauss3}(v)=\exp^2(-4*\pi^2*(v-200)^2*p^2/2)$$

$$I_{gauss4}(v)=\exp^2(-4*\pi^2*(v-300)^2*p^2/2)$$

$$I_{gauss5}(v)=\exp^2(-4*\pi^2*(v-400)^2*p^2/2)$$

$$I_{gauss6}(v)=\exp^2(-4*\pi^2*(v+100)^2*p^2/2)$$

$$I_{gauss7}(v)=\exp^2(-4*\pi^2*(v-200)^2*p^2/2)$$

$$I_{gauss8}(v)=\exp^2(-4*\pi^2*(v-300)^2*p^2/2)$$

$$I_{gauss9}(v)=\exp^2(-4*\pi^2*(v-400)^2*p^2/2)$$

where $v$ is the frequency in GHz and exp is the exponential function.

The parameter of the Gaussian filter (written P) is selected in such a manner that the half-height width of a pattern of the Gaussian filter 18 is equal to twice the half-height spectral of the Gaussian pulses constituting the channel.

In FIGS. 4 and 5, the dashed lines show respectively the intensity response of the periodic Gaussian filter 18 for values of P equal to $T_0/2.20*1e-3$ and to $T_0/2.00*1e-3$, corresponding to respective modulation depths of 2 dB and 3 dB. To obtain a modulation depth of 4 dB, then the value of P should be equal to $T_0/1.86*1e-3$.

In FIG. 6, the dashed line shows the intensity response of a periodic sine filter 18 having modulation depth equal to 4 dB.

The mathematical formula for the intensity profile of the period sine filter 18 of the invention is as follows:

$$L_{sine}(v)=(1-M)+M*\sin^2(2*\pi*(V+50)/200)$$

where the parameter M serves to adjust the modulation depth of the sine filter. In the above example, the period of the filter is 100 GHz, i.e. the spectral spacing between the transmission channels. In order to obtain modulation depth respectively equal to 2 dB, 3 dB, and 4 dB, the values of M should be equal to 0.365, 0.5, and 0.6.

The invention is not limited to the embodiment described above. Any optical device can be used as the noise suppression means providing its transfer function is substantially staircase-shaped (like that of a saturable absorber) so as to suppress all signals of maximum intensity lying below a threshold intensity, while passing signals of maximum intensity that exceeds the threshold intensity.

For example, it is possible to use a NOLM.

It is also possible to use a highly non-linear fiber whose physical effects such as phase self-modulation or phase cross-modulation enable the desired transfer function to be obtained.

It can thus clearly be seen that an optical regenerator device as described above (i.e. associating a periodic Gaussian or sine filter with a saturable absorber) enables DM soliton pulses to be regenerated optically in a manner that is entirely passive, possibly while also simultaneously regenerating all of the multiplexed channels of a given signal.

What is claimed is:

1. A device for optically regenerating pulses, the device comprising an optical bandpass filter adapted to provide time synchronization and intensity stabilization of dispersion-managed soliton pulses, the bandpass filter being adapted to pass a plurality of distinct predefined frequency bands separated in pairs by frequency bands that are attenuated by the filter, so as to filter simultaneously a plurality of frequency-multiplexed pulses in an optical signal, the device further comprising noise suppression means distinct from the bandpass filter, and the bandpass filter presenting low modulation depth.

2. An optical regenerator device according to claim 1, in which the modulation depth of the filter lies in the range 10% to 60% of the frequency height of the pulses to be regenerated.

3. An optical regenerator device according to claim 1, in which the modulation depth of the filter lies in the range 0.5 dB to 4 dB, and preferably in the range 1 dB to 4 dB.

4. An optical regenerator device according to claim 1, in which the noise suppression means comprise a saturable absorber for suppressing amplified spontaneous emission noise.

5. An optical regenerator device according to claim 1, in which the noise suppression means comprise a non-linear optical loop mirror for suppressing amplified spontaneous emission noise.

6. An optical regenerator device according to claim 1, in which the noise suppression means comprise a highly non-linear fiber for suppressing amplified spontaneous emission noise.

7. An optical regenerator device according to claim 1, in which the transfer function of the filter presents a substantially Gaussian or sine profile.

8. An optical regenerator device according to claim 7, in which the half-height frequency width of the filter is substantially equal to twice the half-height frequency width of the pulses to be regenerated.

9. An optical regenerator device according to claim 1, in which the filter is periodic in frequency.

10. An optical regenerator device according to claim 9, in which the filter is a Eabry-Perot type filter.

11. An optical transmission installation for dispersion-managed soliton pulses, the installation including light pulse propagation means, and further including a device for optically regenerating pulses according to claim 1 inserted in the propagation means.

12. An optical transmission installation according to claim 11, in which the regenerator device is inserted in the propagation means in the vicinity of a point where the spectrum width of the pulses reaches a maximum.

13. The use of a device according to claim 1, for regenerating dispersion-managed soliton pulses.

14. An optical transmission installation for dispersion-managed soliton pulses, the installation comprising light pulse propagation means and a device for optically regenerating pulses inserted in said propagation means, said the device for optically regenerating pulses comprising an optical bandpass filter adapted to provide time synchronization and intensity stabilization of dispersion-managed solution pulses, the bandpass filter being adapted to pass a plurality of distinct predefined frequency bands separated in pairs by frequency bands that are attenuated by the filter, so as to filter simultaneously a plurality of frequency-multiplexed pulses in an optical signal, the device further comprising noise suppression means distinct from the bandpass filter, and the bandpass filter presenting low modulation depth, wherein said regeneration device is inserted in the propagation means in the vicinity of a point where the spectrum width of the pulses reaches a maximum, in which the light pulse propagation means comprises first propagation means with abnormal dispersion and second propagation means with normal dispersion, and wherein the light pulse propagation means is adapted so that the pulses reach a maximum spectrum width in the vicinity of the middle of the first propagation means.

* * * * *